United States Patent [19]

Tanji et al.

[11] Patent Number: 5,345,566
[45] Date of Patent: Sep. 6, 1994

[54] METHOD AND APPARATUS FOR CONTROLLING DUAL BUS SYSTEM

[75] Inventors: Masayuki Tanji; Yoshihiro Miyazaki; Hiroaki Fukumaru; Syoji Yamaguchi; Koji Masui; Hisao Ogawa, all of Hitachi, Japan

[73] Assignee: Hitachi, Ltd., Tokyo, Japan

[21] Appl. No.: 825,063

[22] Filed: Jan. 24, 1992

[30] Foreign Application Priority Data

Jan. 25, 1991 [JP] Japan .................. 3-007522

[51] Int. Cl.$^5$ .............................. G06F 13/00
[52] U.S. Cl. ................ 395/325; 364/DIG. 1; 364/228.3; 364/240; 364/240.1; 364/240.4; 364/240.5; 364/242.6; 364/242.92; 371/8.1
[58] Field of Search ............ 395/325, 425, 725; 371/68, 9.1, 11, 8.1; 370/85

[56] References Cited

U.S. PATENT DOCUMENTS

| 4,245,344 | 1/1981 | Richter | 371/68 |
|---|---|---|---|
| 4,473,880 | 9/1984 | Budde et al. | 395/725 |
| 4,484,273 | 11/1984 | Stiffler et al. | 395/325 |
| 4,490,785 | 12/1984 | Strecker et al. | 395/325 |
| 4,495,569 | 1/1985 | Kagawa | 395/725 |
| 4,503,534 | 3/1985 | Budde et al. | 371/9 |
| 4,503,535 | 3/1985 | Budde et al. | 371/11 |
| 4,511,959 | 4/1985 | Nicolas et al. | 395/325 |
| 4,535,448 | 8/1985 | Baxter et al. | 370/85 |
| 4,607,365 | 8/1986 | Loreig et al. | 371/8.1 |
| 4,695,952 | 9/1987 | Howland | 395/325 |
| 4,766,536 | 8/1988 | Wilson, Jr. et al. | 395/325 |
| 4,979,100 | 12/1990 | Makris et al. | 395/325 |
| 4,982,321 | 1/1991 | Pantry et al. | 395/425 |
| 5,202,980 | 4/1993 | Morita et al. | 371/8.1 |

Primary Examiner—Allen R. MacDonald
Assistant Examiner—Ayaz R. Sheikh
Attorney, Agent, or Firm—Antonelli, Terry, Stout & Kraus

[57] ABSTRACT

A method and apparatus for controlling a dual bus system, capable of realizing high speed and continuous operation even if one of the buses of the dual bus system fails. The method and apparatus has a dual bus system, a plurality of electronic circuits connected to both buses of the dual bus system, and bus controller for providing a bus use allowance signal to one of the plurality of electronic circuits, the one electronic circuit being selected in accordance with bus occupation request signals issued from the plurality of electronic circuits requesting data transfer. If the bus occupation request signals for both buses of the dual bus system originates from the one selected electronic circuit and the outputs of the arbiters coincide, the bus use allowance signal is provided to the one selected electronic circuit for the allowance of occupying both buses of the dual bus system. A completion of data transfer at the dual bus system is determined when data transfer is completed at both buses. Continuous operation can be ensured immediately upon occurrence of a failure, and high speed operation of a computer system is possible.

7 Claims, 8 Drawing Sheets

METHOD AND APPARATUS FOR CONTROLLING DUAL BUS SYSTEM

BACKGROUND OF THE INVENTION

1. Field of the Invention

The present invention relates to a method and apparatus for controlling a dual bus system used by high reliability computers (fault tolerant computers) or the like.

2. Description of the Related Art

Technique for realizing high reliability of computers is known as described in U.S. Pat. No. 4,484,273 entitled "MODULAR COMPUTER SYSTEM". According to this related background art, a plurality of processors, memories and bus adapters in a computer system are connected to a dual bus system and to interface units connecting the buses. Of the dual bus system, an executive bus operates at normal times. A non-executive bus stands by or operates as another access path to improve the system throughput.

Another background technique for realizing high reliability of computers is described in "Nikkei Electronics", May 9, 1983 Issue, at pp.197 to 202. This background art uses a method called a pair-and-spare method which is characterized in that each logical unit has a pair of partner boards operating at a lock-step. If one of the pair boards becomes faulty, it is disconnected to allow a continuous operation of the other correct board, without intervention by the operating system.

In the dual bus system of the first background art, it is necessary to regularly patrol the standby bus so as to check the soundness of it. This check necessarily requires support by the software. If the patrol period is made short in order to improve the check precision, the system performance is degraded. If one of the buses of the dual bus system is used as another access path, support by software is required for the case of a failure of the other of the buses, and the system performance is considerably degraded.

The second background art using the pair-and-spare method eliminates the above-described disadvantage. However, since the two boards operate synchronously with each other using clocks, there is a limit of operation speed, and the retry control upon occurrence of intermittent errors is difficult.

SUMMARY OF THE INVENTION

It is an object of the present invention to provide a method and apparatus for controlling a dual bus system, capable of realizing high speed and continuous operation even if one of the buses of the dual bus system fails.

In order to achieve the above object of the present invention, synchronization for dual bus operation is achieved on a data transfer unit basis.

Total bus arbitration is managed in accordance with whether comparators determine that arbitration results are coincident for both of the buses. The timing of data transfer completion, interrupt, and retry are determined by exchanging the states of dual sequencers which control the data transfer.

If one of the buses becomes faulty, a fault signal is output to make the other bus operative and a predetermined state is set as the state of the sequencer for this bus.

According to the method and apparatus for controlling a dual bus system of the present invention, synchronization for dual bus occupation control is achieved on a data transfer unit basis. Therefore, even if one bus becomes faulty and data transfer becomes impossible, data transfer can be continued on the other bus at once, without the help of software.

Furthermore, at the time of data transfer, only the timing of bus arbitration and data transfer completion are considered. Therefore, the start and following timing of data transfer may differ between both buses of the dual bus system. A shift of data transfer start timing, caused by a frequency difference between clocks for a microprocessor and buses, is therefore permitted, as well as a difference of bus access response time between units connected to the dual bus system. For example, a refresh cycle or memory error correction cycle of a memory connected to a bus or buses can be determined independently from other units, resulting in a simple hardware configuration.

DETAILED DESCRIPTION OF THE PREFERRED EMBODIMENTS

Preferred embodiments of the present invention will be described with reference to the accompanying drawings.

Figure 1:
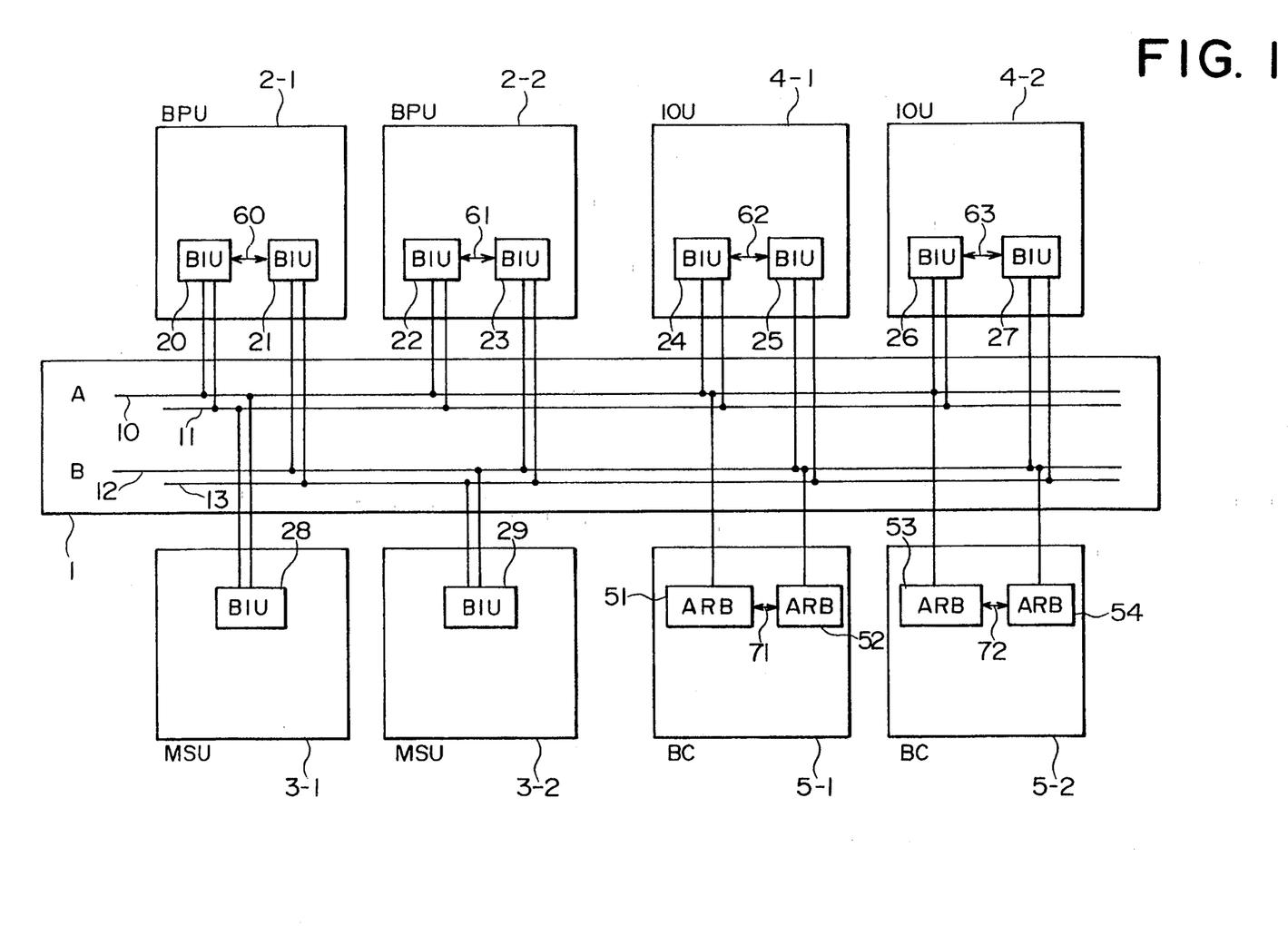
FIG. 1 shows the configuration of a computer system according to the present invention.

FIG. 1 shows an example of the configuration of a computer system for controlling a dual bus system, according to the present invention. Reference numeral 2 represents a basic processing unit (BPU), and reference numeral 4 represents an input/output unit (IOU). Two pairs of BPU's 2-1 and 2-2 and IOU's 4-1 and 4-2 may operate in a master-slave relationship or may operate in a peer relationship. Reference numeral 3 represents a main storage unit (MSU) connected to one of buses A and B of a dual bus system. In this embodiment, each MSU 3 is connected to one of the buses A and B. However, each MSU 3 may be connected to both buses A and B. BPU 2, IOU 4 and MSU 3 transfer data amongst themselves. Data transfer is controlled by each bus interface unit (BIU) 20 to 29. BIUs connected to the buses A and B of the dual bus system 1 are interconnected by signal lines 60 to 63 for synchronization of the dual bus system. A bus controller (BC) 5 includes an arbitration controller (ARB) for occupation control of the dual bus system. The arbitration controllers 51 and 52 are interconnected by a signal line 71, and the arbitration controllers 53 and 54 are interconnected by a signal line 72. The signal lines 71 and 72 are used for synchronization of occupation control of the dual bus system. In the dual bus system 1, reference numerals 10 and 12 collectively represent signal lines for data transfer, and reference numerals 11 and 13 represent signal lines on which a signal representative of a fault state of each bus is transmitted. These signal lines are connected to each BIU 20 to 29.

Figure 2:
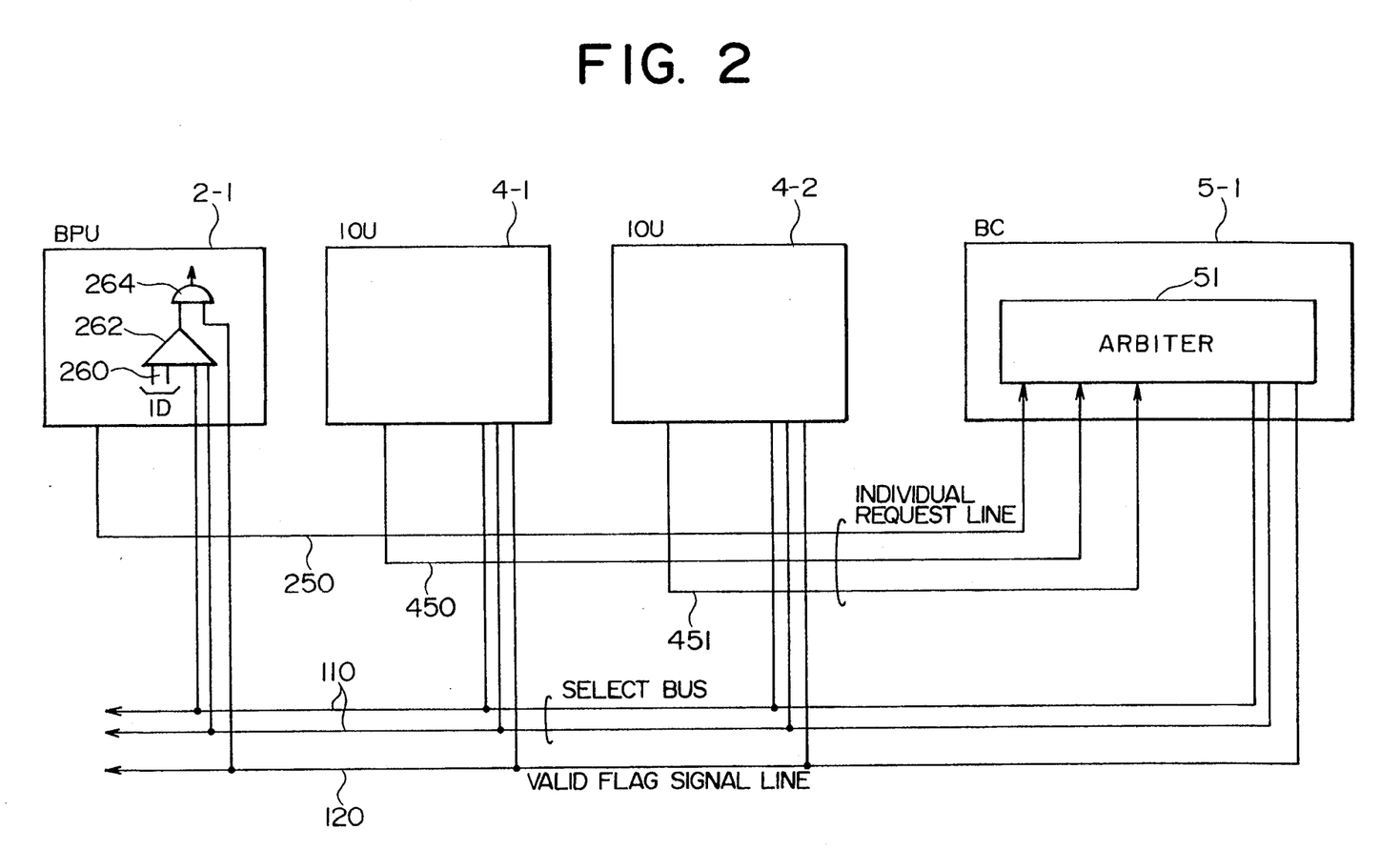
FIG. 2 is a block diagram showing the fundamentals of bus arbitration.

FIG. 2 is a block diagram showing the fundamentals of bus occupation control. Consider the case where BPU 2-1 and IOUs 4-1 and 4-2 request a bus occupation. These units request BC 5-1 to occupy the buses, using individual bus request lines 250, 450 and 451, respectively. The arbitration controller 51 of BC selects a unit having the highest priority, outputs an ID number of the selected unit to a select bus 110, and outputs a signal indicating that the contents on the select bus are valid, to a valid flag signal line 120. The arbitration controller 51 can generate an ID number by discriminating between the individual bus request lines.

Each unit requesting a bus occupation reads the contents on the select bus 110 and valid flag signal line 120, and determines whether or not the bus occupation request was accepted. For example, in BPU 2-1, the contents on the select bus are compared with an ID number 260 assigned to BPU 2-1. An AND gate 264 masks the comparison result by the valid flag signal on the signal line 120. An output "1" of the AND gate 264 indicates that the bus occupation request was accepted. ID numbers 260 are arranged to have one-to-one correspondence with ID numbers output from the arbitration controller 51 to the signal lines 110.

For the simplicity of description, FIG. 2 shows connections between only one arbitration controller 51 of BC 5-1 and other units BPU and IOUs. In an actual case, the bus arbitration controller 51 for bus A as well as another bus arbitration controller for bus B are provided for the dual bus system. Particular connections for the two bus arbitration controllers are shown in FIG. 3.

Figure 3:
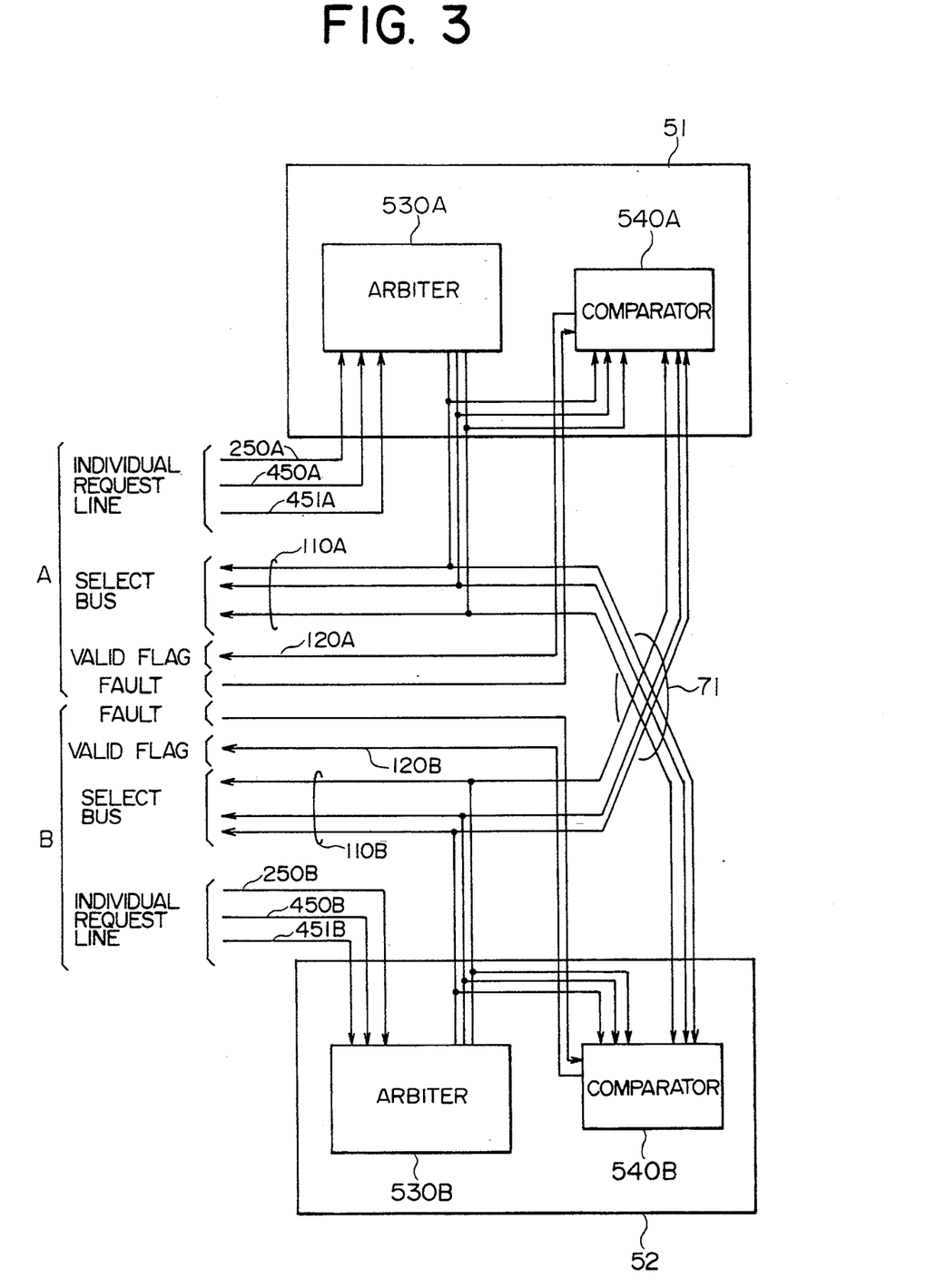
FIG. 3 is a block diagram showing synchronization for bus occupation control.

FIG. 3 illustrates synchronization for dual bus occupation control. Synchronization is detected by the two arbiters in such a manner that arbitration between the buses is completed when both bus arbitration results coincide. The arbiters 51 and 52 shown in FIG. 3 each have a priority judgment circuit 530 and a comparator 540. The comparator 540 is input with the priority judgment results of its own bus and the other bus. If both the priority judgment results coincide, a valid flag is turned on and output to the signal line 120. The arbiter 52 for the other bus has the same structure and operation as those of the arbiter 51.

Figure 4:
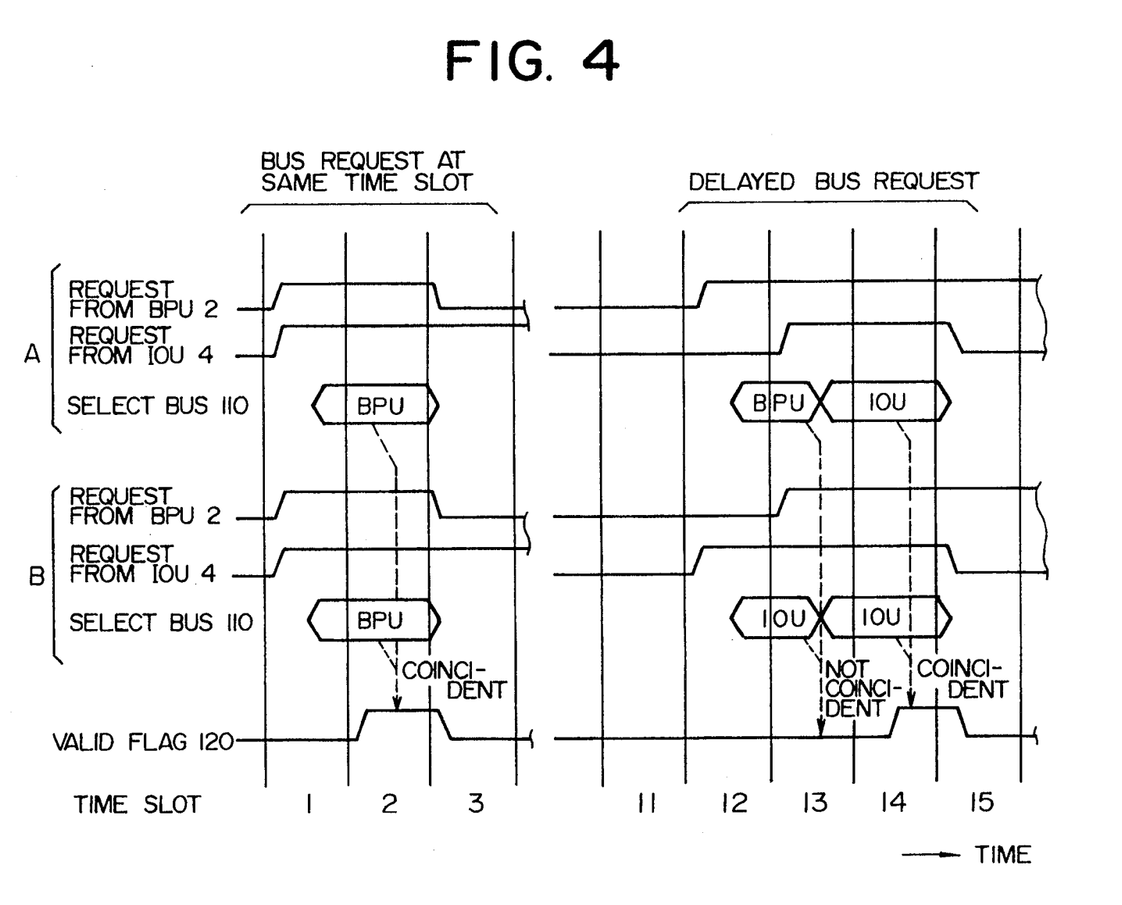
FIG. 4 is a timing chart showing an example of synchronization for bus occupation control.

An example of the operation of the arbiter will be described with reference to FIG. 4. Consider the case where bus occupation requests were issued at a time slot 1 from BPU 2 and IOU 4. The contents of the select buses 110 for buses A and B established one time slot later by the priority judgment circuits 530 are the same, so that a valid flag on the signal line 120 becomes "1" at a time slot 2. This case is fastest in arbitration operation, and most arbitration operations fall in this category.

Consider another case where BPU 2 and IOU 4 operate asynchronously with the buses and bus occupation requests being synchronized using flip-flops. In such a case, bus occupation requests may sometimes be output at different time slots. For example, as shown in the right half of FIG. 4, at a time slot 12 BPU requests bus A and IOU requests bus B, and at the next time slot 13 IOU requests bus A and BPU requests bus B. Assuming that IOU has a higher priority than BPU for both buses A and B, a valid flag is not set at the time slot 13 because the contents of the select buses 110 are not coincident, but rather at a time slot 14 when the contents become coincident. In this case, bus occupation control requires one more time slot. However, this case seldom occurs to such a degree that it can be neglected as viewed from the whole system.

Figure 5:
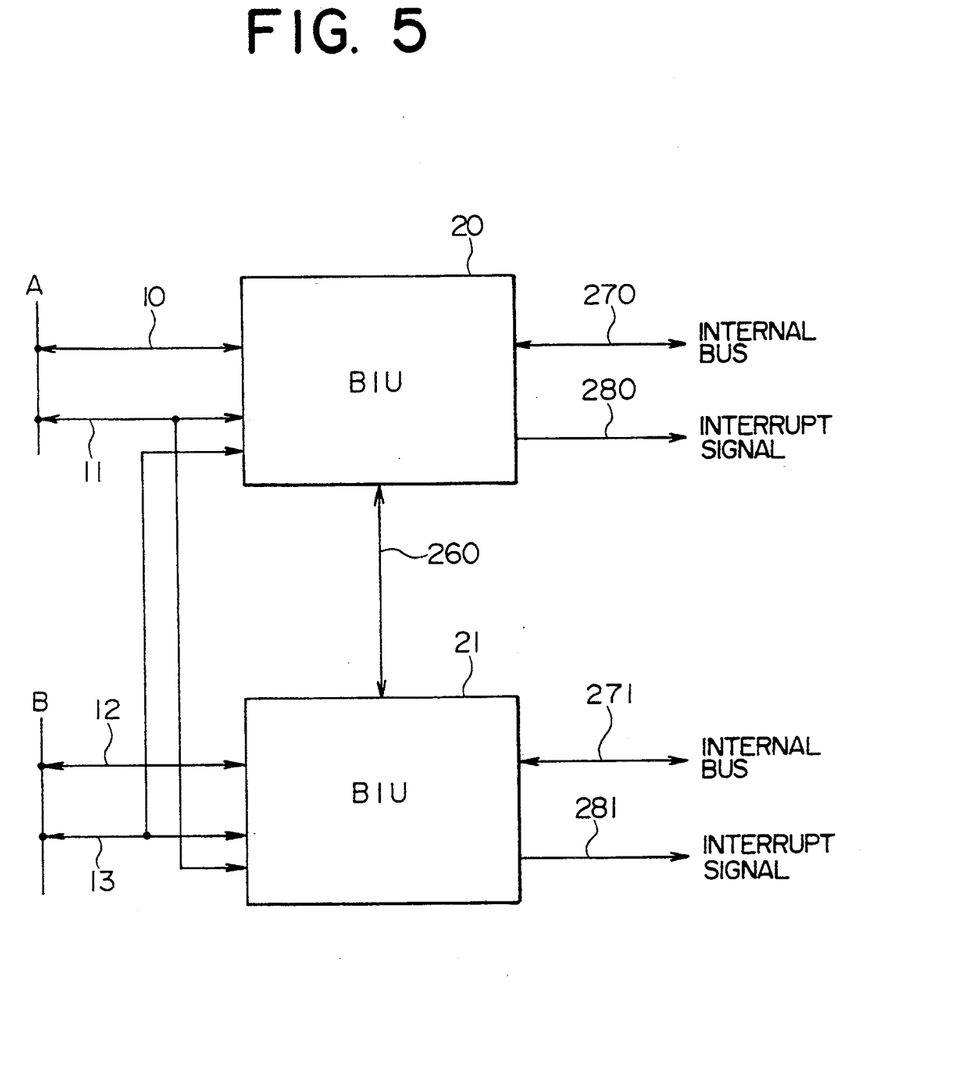
FIG. 5 is a block diagram showing connections to and from BIUs.

FIG. 5 is a block diagram showing connections to and from BIUs which detect the timing of data transfer completion on the dual bus system. Synchronization is achieved by a pair of two BIUs. Two BIUs 20 and 21 are connected to the signal lines 10 and 1 of bus A, and to the signal lines 12 and 13 of bus B. Signal lines 270 and 271 are connected to the internal buses of the BIUs. Each BIU picks up fault signals on the signal lines 11 and 13 for buses A and B to control the internal circuit of BIU. Synchronization of operations of the two BIUs is achieved by exchanging internal transition states via a signal line 260. Interrupt signals on lines 280 and 281 interrupt microprocessors of the BIUs or IOUs.

Figure 6:
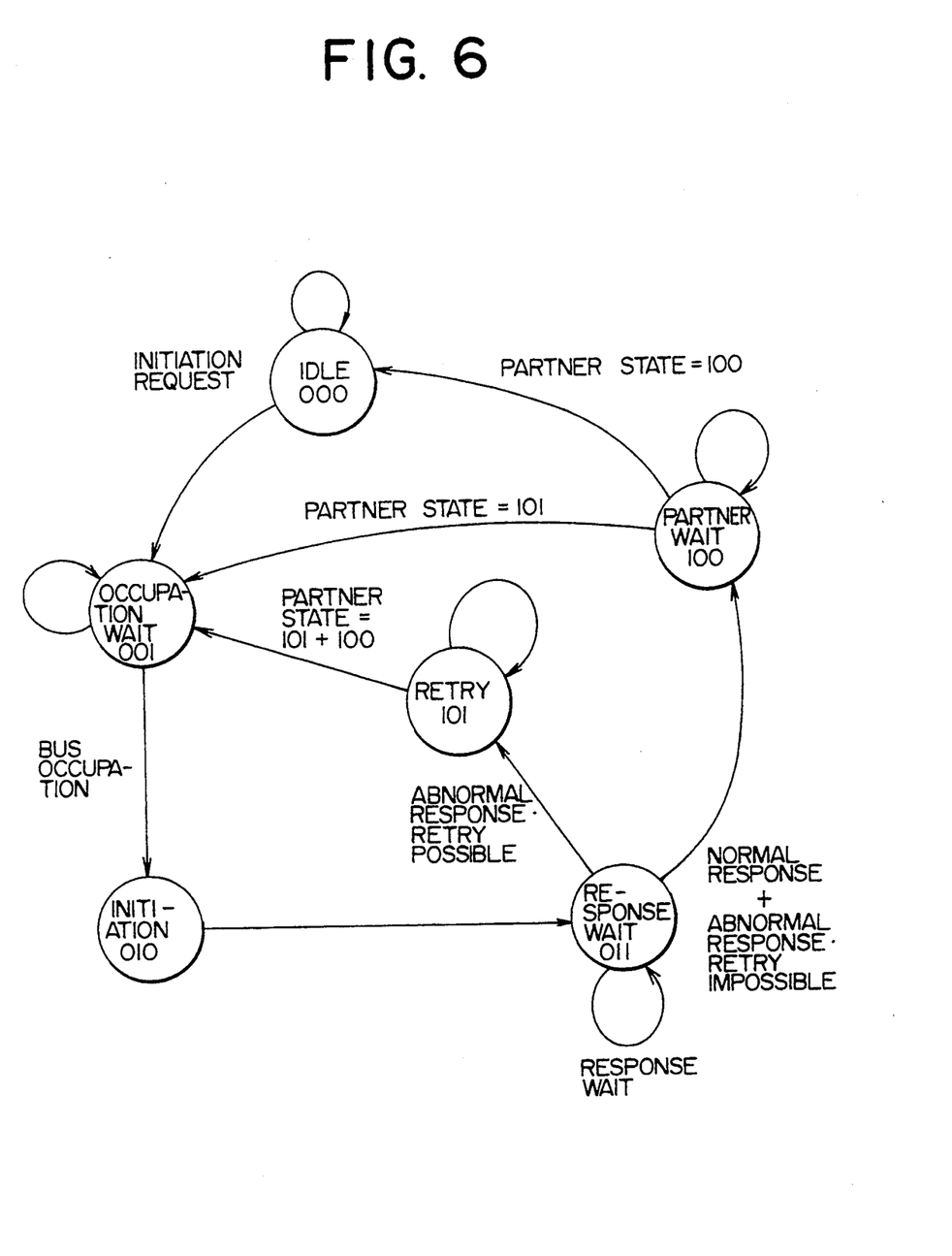
FIG. 6 is a diagram showing state transitions of BIU.

FIG. 6 is an internal state transition diagram of a BIU. Internal states include six states, each identified by assigning a three-bit identification number. "000" stands for an idle state during which BIU executes no operation. Upon reception of an initiation request, BIU transmits to a bus occupation wait state "001". When the bus is occupied, BIU transmits to an initiation state "010" for initiating data transfer. After data transfer, BIU transmits to a response wait state "011" for waiting for a response from a transfer destination. If a response from a transfer destination is normal or if it is abnormal and a retry is impossible because of retry-over, BIU transmits to a partner wait state "100" for monitoring the state of the partner BIU. If the partner BIU is in the same state "100", a response is sent back to the units which initiated BIUs, and BIUs return to the idle state "000". In this manner, the timing of data transfer completion at both buses of the dual bus system can be detected by monitoring the signal line 260 until the state of the partner BIU becomes coincident with the subject BIU.

With the above-described control operation, synchronization of data transfer is achieved when both buses complete the data transfer.

Furthermore, interrupt can be considered as one type of access via a bus. In this context, an interrupt signal can be output to the interrupt signal line after synchronization of data transfer is completed at both buses.

In the response wait state "011", if the response from a transfer destination is abnormal and a retry is possible, BIU transmits to a retry state "101". BIU then transmits to the bus occupation wait state "001" for occupying the bus for the retry, under the condition that the state of the partner BIU is "100" or "101". Retry is therefore executed when both BIUs transmit to the retry state "101", and when the subject BIU is in the retry state "101" and the partner BIU is in the partner wait state "100". Under the latter condition, in order to allow the partner BIU to execute the retry, a transition path is provided between the partner wait state "100" and the bus occupation wait state "001" when the state of the partner BIU is the retry state "101" at the partner wait state "100".

When one of the buses of the dual bus system fails, BIUs detect the fault signal on the signal line 11 or 13. BIU for the defective bus fixes its state to the partner wait state "100" and stops its operation. BIU for the normal bus can thus operate independently without waiting for synchronization with BIU for the faulty bus.

Figure 7:
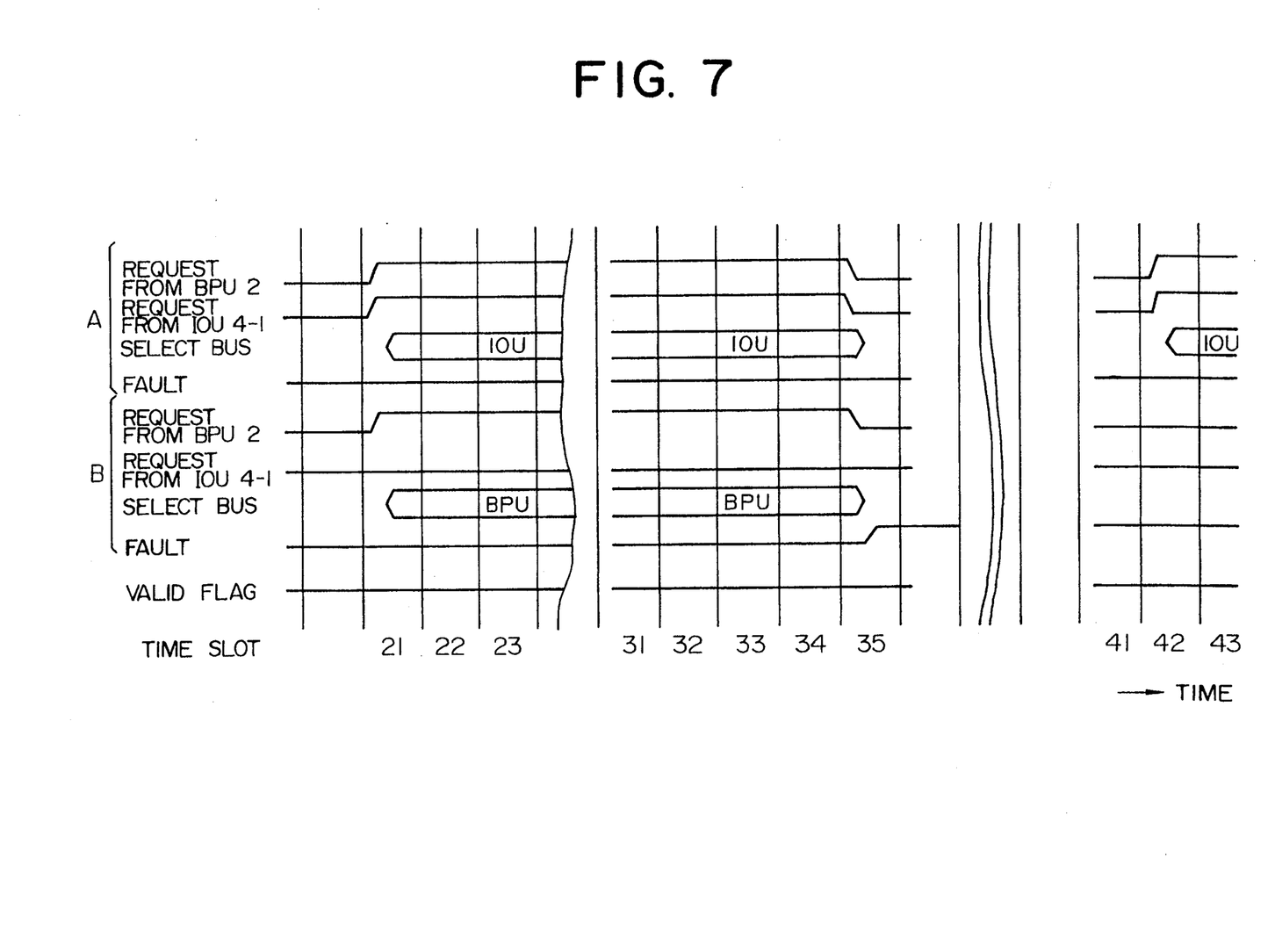
FIG. 7 is a timing chart showing an example of abnormal operation of one bus.

FIG. 7 is the timing chart showing the operation when BIU 25, connected to bus B among BIUs 24 and 25 of IOU 4-1, becomes faulty and cannot output a bus request. It is assumed that BPU 2 and IOU 4-1 request buses at a time slot 21, and that IOU 4-1 has a higher priority than BPU 2 at that time. Upon reception of a request for bus A output from BPU 2 and IOU 4-1 at the same time, IOU having the higher priority is selected and its ID number is output to the select bus 110. However, a request for bus B from IOU 4-1 cannot be output because of the failure of BIU 25, so that a request from BPU 2 is accepted irrespective of the bus request priority. In this case, the outputs from the priority judgment circuits 530A and 530B are not coincident and arbitration between bus occupation requests will not be settled. Therefore, both BPU and IOU detect a time-out. After detecting the time-out, BPU and IOU check their bus requests on the individual request lines. Since BPU requests both buses A and B, it retries the requests. In the case of IOU, a request for bus B is not output so that it outputs a fault signal for bus B and retries the requests. When each unit connected to bus B receives the fault signal, data transfer via bus B is abandoned and switched to bus A. In this case, the comparators 540 of the arbiters do not execute a comparison operation between the contents of the select buses for buses A and B. In addition, the timing of data transfer completion for two BIUs is not checked, allowing bus A to operate alone.

Time slots 41 to 43 show the operation that a request for bus A is retried by BPU and IOU and the IOU occupied bus A through arbitration.

Figure 8:
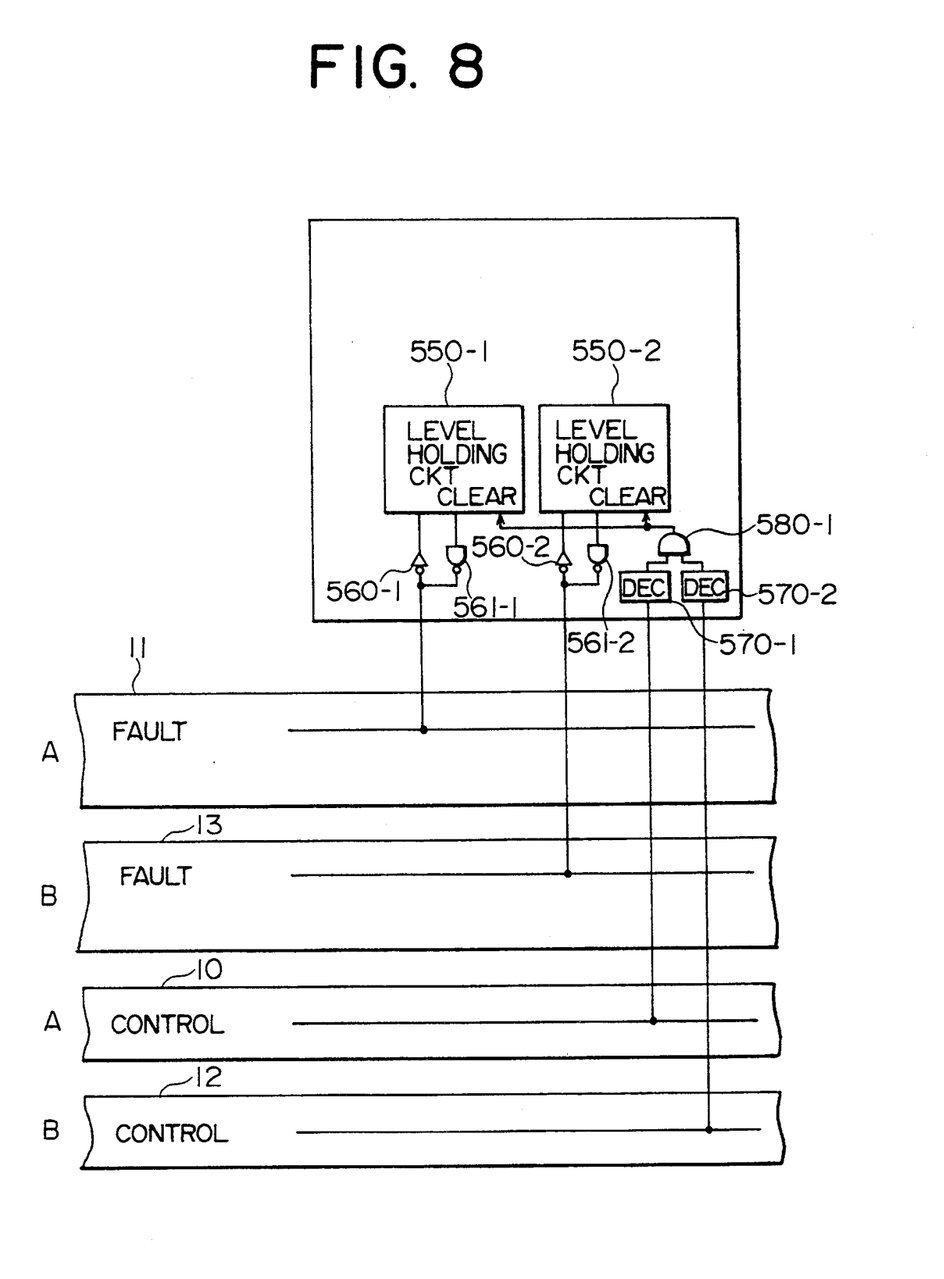
FIG. 8 is a block diagram showing a fault level holding circuit.

FIG. 8 shows how the level of a fault signal is held. Generally, a fault tolerant system allows a defective unit to be replaced during operation. If a unit which detects a fault and outputs a fault signal is removed from the system, the system takes an apparent normal state for both buses while leaving a data non-coincidence signal between the MSUs. In order to avoid such a contradiction, it becomes necessary to hold the level of a fault signal. Level holding circuits 550-1 and 550-2 are constructed by flip-flops. A fault signal is input via signal lines 560-1 and 560-2, and the outputs of the level holding circuits are supplied to the fault signal lines 11 and 13 via wired-OR gates 561-1 and 561-2. When a fault signal is turned on by another unit, the corresponding one of the circuits 550-1 and 550-2 holds the level of the fault signal even if the other unit is removed from the system. It is necessary to clear the fault signal if the repaired unit is again mounted on the system. To this end, control signals on buses A and B are decoded by decoders 570-1 and 570-2 to generate clear signals. If both clear signals are the same, an AND gate 580-1 outputs a signal for resetting the level holding circuits 550-1 and 550-2.

According to the present invention, clocks for buses and for units connected to the buses may be asynchronous. Therefore, the performance of MPU is not constrained by buses, and a retry is not restricted when an abnormal state of a unit connected to the dual bus system is detected, facilitating the designs of units.

Furthermore, according to the present invention, even if a fault occurs, it is possible to run the system with hardware controlled reconfiguration, improving transparency as viewed from software and facilitating application of general operating systems.

Many different embodiments of the present invention may be constructed without departing from the spirit and scope of the invention. It should be understood that the present invention is not limited to the specific embodiments described in this specification. To the contrary, the present invention is intended to cover various modification and equivalent arrangements included within the spirit and scope of the claims.

What is claimed is:

1. The dual bus control method having a dual bus system, a plurality of electronic circuits, each having a dual bus interface, connected to both buses of said dual bus system, and bus controllers, each of said bus controllers being connected to both of said buses and being interconnected by interactive paths, each of said bus controllers providing a bus use allowance signal through an arbiter thereof to one of said plurality of electronic circuits having issued a bus use request signal through a request line thereto, said dual bus control method comprising the steps of:

providing said bus use allowance signal to said one electronic circuit for allowing occupation of both buses of said dual bus system if said bus occupation request signals for both buses of said dual bus system originate from said one selected electronic circuit and said bus use allowance signals, via said arbiter, from said bus controllers coincide with one another;

determined completion of data transfer by said bus controllers at said dual by system if data transfer is completed at both buses; and when an intermittent fault occurs on one of said buses of said dual bus system and a retry operation is to be executed, a retry operation executing on the other of said buses.

2. The dual bus control method according to claim 3, wherein an interrupt is issued between said electronic circuits when a data transfer at said dual bus system is completed.

3. The dual bus control method according to claim 1, wherein, when a solid fault occurs on one of said buses of said dual bus system, said electronic circuit having detected said solid fault informs others of said plurality of electronic circuit of an occurrence of said fault, and said bus controller stops a process of checking whether or not outputs of said arbiters coincide, and said electronic circuits stop a process of determining completion of data transfer at said dual bus system if data transfer is completed at both buses.

4. The dual bus control apparatus having a dual bus system, a plurality of electronic circuits, each having a dual bus interface, connected to both buses of said dual bus system, and bus controllers, each of said bus controllers being connected to both of said buses and being interconnected by interactive paths, each of said bus controllers providing a bus use allowance signal through the buses to one of said plurality of electronic circuits having issued a bus use request signal through request line thereto, said dual bus control apparatus comprising:

two bus interface units provided to each of said plurality of electronic circuits and connected to both buses of said dual bus system, said two bus interface units sending said bus occupation request signals to said buses for the data transfer to said buses, starting data transfer to said buses when both of said bus use allowance signals are received, and terminating the bus use when data transfer to both buses is completed; and two bus arbitration controllers provided to said bus controller and connected to both buses of said dual bus system, each of said two bus arbitration controllers comprising an arbiter for selecting one of said bus occupation request signals from said plurality of electronic circuits, and a comparator for providing said bus use allowance signal for the buses of said dual bus system if two of said arbiters selected the same electronic circuit;

wherein said two bus interface units of said electronic circuit are provided with a means for, when an intermittent fault occurs on one of said buses of said dual bus system and a retry operation is to be executed, executing a retry operation also on the other of said buses.

5. A dual bus control apparatus according to claim 4, wherein each of said plurality of electronic circuits is provided with a function for issuing an interrupt to said one of electronic circuits as a data transfer at said dual bus system.

6. The dual bus control apparatus according to claim 4, wherein said two bus interface units of said electronic circuit are provided with a function of, when a solid fault occurs on one of the buses of said dual bus system, said bus interface unit having detected said solid fault informs the other said bus interface units of an occurrence of said fault, and said comparator of said bus controller has a function of stopping a process of comparing the arbitration results from said arbiters.

7. A dual bus control apparatus, comprising:

two bus controllers;

two bus arbiters included in each of said bus controllers and connected to both buses of said dual bus system, each of said two bus arbiters selecting one of a plurality of electronic circuits issuing bus occupation request signals; and a comparator included in each of said bus controllers for providing said bus use allowance signal for said buses of said dual bus system if two of said arbiters select a same electronic circuit.

* * * * *